Feb. 24, 1953
U. U. SAVOLAINEN
2,629,514
PRESSURE RECEPTACLE AND CLOSURE THEREFOR
Filed Feb. 6, 1948
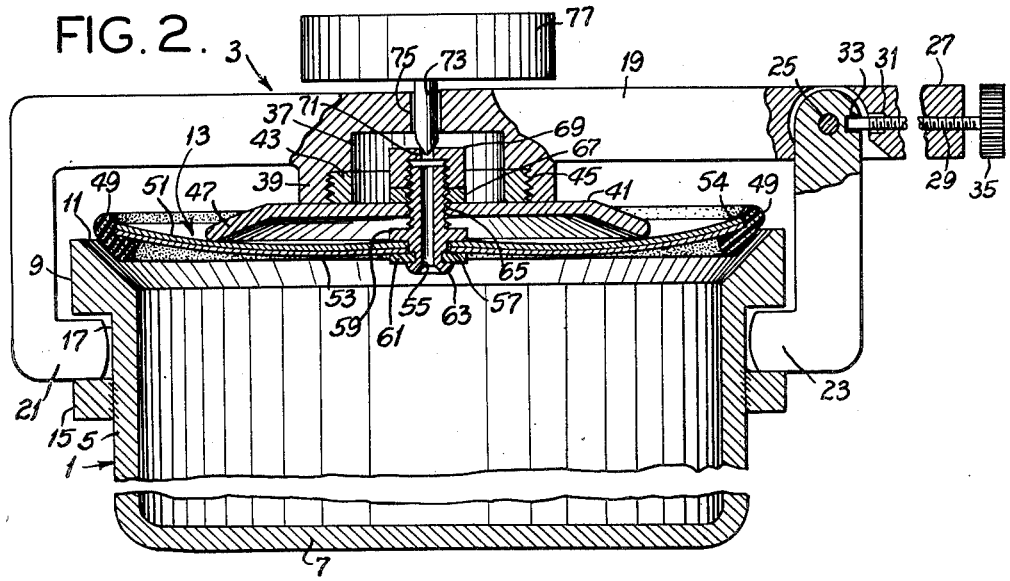
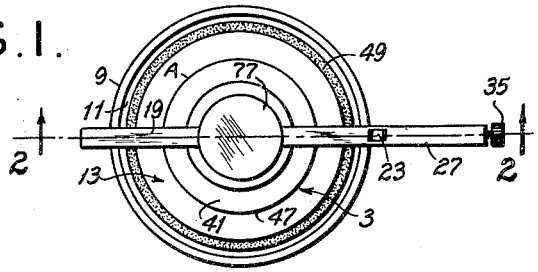
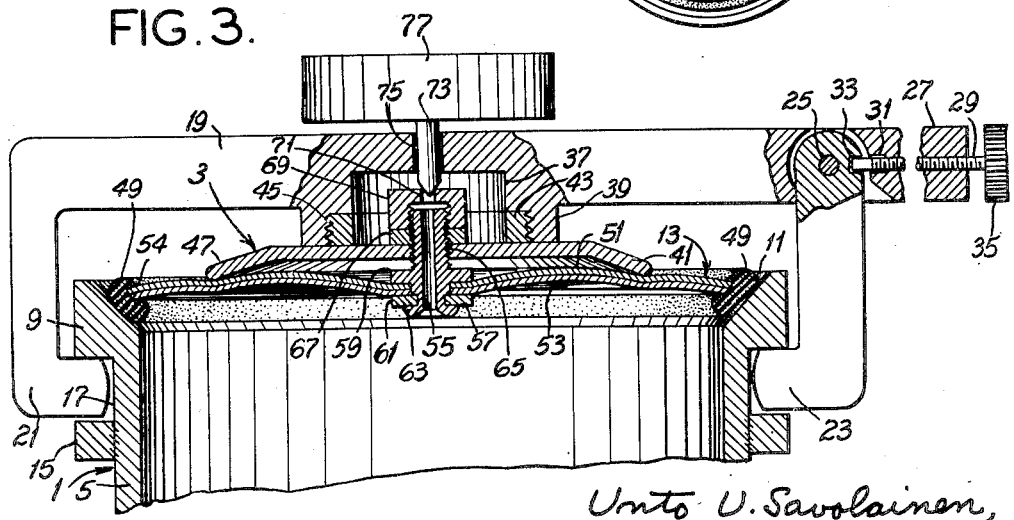
Unto U. Savolainen, Inventor.
Haynes and Koenig, Attorneys.

Patented Feb. 24, 1953

2,629,514

UNITED STATES PATENT OFFICE 2,629,514

PRESSURE RECEPTACLE AND CLOSURE THEREFOR

Unto U. Savolainen, Attleboro, Mass., assignor to Metals & Controls Corporation, Attleboro, Mass., a corporation of Massachusetts Application February 6, 1948, Serial No. 6,714

16 Claims. (Cl. 220—57)

This invention relates to pressure receptacles and closures therefor, and more particularly to pressure cookers and like vessels and to removable lids or covers for tightly sealing such vessels to hold pressure therein.

This invention is an improvement upon the pressure receptacle closure disclosed in the copending application of myself and others entitled Pressure Receptacle and Closure Therefor, Serial No. 6,684, filed February 6, 1948.

Among the several objects of the invention may be noted the provision of a pressure receptacle such as a pressure cooker or like vessel having an improved, readily removable closure comprising a cover or lid adapted tightly to seal the receptacle so that pressure may build up therein; the provision of a receptacle and closure therefor of the class described wherein the closure comprises a cover or lid which seats externally upon the vessel so as to be readily removable, yet which is adapted increasingly to seal the receptacle as the pressure within the receptacle increases; the provision of a receptacle and closure construction of this class which enables the receptacle to be formed without any obstructions that would interfere with the pouring of the contents of the receptacle; the provision of a closure of the class described adapted automatically to vent the receptacle until its contents are heated to a predetermined temperature to permit air to escape, and then automatically to seal the receptacle for pressure cooking or the like; the provision of a closure of this class affording improved safety in pressure relief at the edges of the lid; the provision of a closure of this class permitting adjustment of the temperature characteristics of the lid; the provision of a closure of this class permitting the use of a fixed venting valve; and the provision of a closure such as described which is easy to apply and remove so that it is particularly suitable for use with a household pressure cooker. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which one of various possible embodiments of the invention is illustrated, Fig. 1 is a plan view of a pressure receptacle and closure embodying this invention;

Fig. 2 is an enlarged vertical section taken on line 22 of Fig. 1; and,

Fig. 3 is a view similar to Fig. 2, but showing parts in a different operating position.

Similar reference characters indicate corresponding parts throughout the several views of the drawing.

Referring to the drawing, a pressure cooker or like pressure receptacle of this invention is shown generally to comprise a vessel or cooker body 1 and a removable closure 3. The vessel 1 has a cylindrical wall 5 and a bottom 7, being open at its upper end. It is provided with an external flange 9 at its mouth, and with an upwardly facing conical seating surface 11 surrounding its mouth for peripheral sealing engagement by a novel cover or lid, generally designated 13. The vessel is also provided with an external flange 15 spaced from flange 9 to form an external annular groove 17. The interior of the vessel is unless otherwise desired wholly smooth and unobstructed so that there is no interference to pouring of its contents over any portion of the sloping annular seating surface 11.

The closure 3 includes a bridge member 19 carrying the lid 13 and adapted detachably to be locked to the vessel 1 in position above and spanning its mouth, with the lid in position to close the vessel. As illustrated, the bridge member 19 is integrally formed at one end with a depending hook 21 engageable in the annular groove 17. Another hook 23 is pivoted in the bridge member to depend therefrom adjacent its other end, as indicated at 25. The latter hook is adapted to swing into and out of the annular groove 17 diametrically opposite hook 21 for detachably locking the bridge member 19 and lid 13 carried thereby to the vessel. A portion of the bridge member extending outward beyond the pivot 25 forms a handle 27. Means for latching the pivoted hook 23 in engagement in annular groove 17 is illustrated as comprising a latch 29 threaded in a longitudinal bore 31 in the handle. The inner end of the rod 29 is adapted to engage in a notch 33 in the upper end of hook 23 to prevent pivotal movement thereof upon its engagement in annular groove 17. The outer end of the rod 29 is provided with a knob 35 for conveniently threading it into or out of the notch 33.

The bridge member 19 is formed with a central recess 37 opening downward into the interior of an annular boss 39 which extends downward from the bridge member. The recess and boss are disposed substantially concentric with the cylindrical wall 5 and annular seating surface 11 of the vessel when the bridge member is locked to the vessel. A circular plate 41 closes the lower end of the boss, having a ring 43 secured by welding or otherwise centrally upon its upper face. The latter is threaded into the boss, as indicated at 45. The peripheral portion of the plate 41 is bent downward to form a depending annular rim 47, so that the plate is of inverted dish or saucer shape. This annular rim functions as a fulcrum member in cooperation with lid 13 in a manner to be described.

The lid 13 comprises a circular resilient plate, preferably a dished, snap-acting plate of thermostat bimetal formed in accordance with the disclosure in the Spencer United States Patent 1,448,240 to have two oppositely bowed positions of stability dependent upon its temperature, these positions being illustrated in Figs. 2 and 3, respectively. The lid is preferably provided with a peripheral sealing ring 49 of rubber or other suitable material, adapted to seal upon the seat 11 of the vessel in the Fig. 3 position of the lid. It is carried by the bridge member 19 substantially concentric with the seat in such manner that it may snap between its Figs. 2 and 3 positions. The lid 13 is mounted with its high-expansion component 51 towards the outside and its low-expansion component 53 towards the inside of the vessel. Thus, it occupies the position of Fig. 2 when its temperature is below a predetermined value. In this "cold" position it is bowed away from the vessel, being convex with respect to the vessel, and ring 49 is spaced outward from seat 11, completely free from sealing engagement with the seat, to vent the vessel. The lid 13 occupies the position of Fig. 3 when its temperature is above a predetermined value. In this "hot" position it is bowed toward the vessel, concave with respect thereto, and ring 49 seals upon the seat 11. The lid engages and reacts against the rim or fulcrum 47 of plate 41 in either of its positions. The terms "convex" and "concave" relate to the inside surface of the plate 41 as viewed from a point within the vessel.

The rubber ring 49 may be fastened in any suitable manner upon the periphery of the lid 13. As herein illustrated, the ring is provided with an internal groove 54 receiving the periphery of the plate. The ring when untensioned is of somewhat smaller diameter than lid 13, and thus is retained upon the lid stretched under tension when applied. This construction permits ready removal and replacement of the sealing ring.

The lid 13 is centrally supported from the plate 41 by a vent pipe 55 which extends through a central aperture 57 in the lid 13. The latter is tightly retained (to provide against inadvertent leakage) upon the lower end of the vent pipe between collars 59 and 61 provided on the pipe. If necessary, a sealing gasket (not shown) can be used in conjunction with collars 59 and 61. The upper collar 59 may be formed integrally with the pipe and the lower collar may be riveted upon a reduced-diameter portion at the lower end of the pipe, as illustrated at 63.

The vent pipe extends upward from the lid 13 through the plate 41 into the chamber formed by recess 37 and boss 39. The pipe is externally threaded above the upper collar 59 and is adjustably threaded in the plate 41 as indicated at 65. Thus, the pipe and the center of the lid 13 are fixed in respect to the plate 41, differing from the closure of the aforesaid copending application wherein the pipe and the center of the lid are movable with respect to plate 41. The valve structure is not subject to sharp blows or the rapid movements of the lid 13 when the lid snaps from one position to the other position. A nut 67 is threaded down on the pipe into engagement with the plate 41 to lock the pipe and the center of the lid in adjusted position.

While the center of the lid is normally fixed relative to the plate 41, it may be adjusted to regulate the temperature at which the lid snaps from its cold position of Fig. 2 to its hot position of Fig. 3. This adjustment is made by threading the vent pipe 55 into or out of plate 41 as required. To lower the temperature at which the lid will snap from its cold to its hot position, the pipe is threaded into the plate 41 to fix the center of the lid closer to the plate. To raise this temperature, the pipe is threaded outward to relieve the restraint upon the lid. It will be understood that the nut 67 is loosened and tightened as required by adjusting operations.

A cap 69 having an aperture 71 in its upper end is threaded on the upper end of the vent pipe. Aperture 71 is in communication with the pipe. The cap provides a valve seat for a pressure relief valve comprising a valve member or stem 73 loosely slidable vertically in an aperture 75 in the bridge member 19, and biased downward by a weight 77 on the upper end of the stem. The lower end of the valve stem 73 is tapered to enter the aperture 71. Stem 73 is sufficiently loose in aperture 75 for steam venting purposes.

When the lid 13 is in its vessel-sealing position of Fig. 3, it is subjected to stress and deformation by the force due to pressure within the vessel acting upon the central circular portion of the lid circumscribed by the rim 47, by the force due to pressure within the vessel acting upon the annular peripheral portion of the lid outward of the rim, and by the inherent internal force within the lid due to its thermostatic action under heat. The force due to internal pressure acting upon the central circular portion of the lid circumscribed by the rim 47 establishes a moment which tends to bulge this portion of the lid upward and outward, thus tending to cause the lid to flex concavely with respect to the vessel. The force due to internal pressure acting upon the annular peripheral portion of the lid outward of the rim 47 establishes an oppositely directed moment about the rim which tends to cause this portion of the lid to flex upward about the rim, thus tending to cause the lid to flex convexly with respect to the vessel. The inherent internal force within the lid due to its thermostatic action tends to cause the lid to flex concavely. All these forces are resisted by the rim (and fixed vent pipe 55), the rim functioning as a fulcrum about which the lid may flex.

To attain a seal, the rim 47 is made of such diameter that the combined deformative action of the effective moment of the force due to internal pressure acting upward upon the central circular portion of the lid circumscribed by the rim and the inherent thermostatic action of the lid, both of which tend to cause the lid to flex concavely, is greater than the deformative action of the effective moment of the force due to internal pressure acting upward upon the annular peripheral portion of the lid outward of the rim. The result is that the upward bulging of the central circular portion of the lid (the area bounded by the line A, Fig. 1) and the downward flexing of the lid due to thermostatic action overcome the tendency of the annular peripheral portion of the lid (the area outside line A) to bend upward. The latter portion consequently flexes downward about the rim 47 as a fulcrum, thus forcing the peripheral sealing ring 49 of the lid into sealing engagement with the seal 11. As the pressure within the vessel and the temperature increase, the seal becomes tighter.

The diameter of the rim 47 may be such that the effective moment of the total force due to internal pressure acting upon the central circular portion of the lid within line A tending to bulge it upward and outward is either greater than, equal to, or somewhat less than the effective moment of the total forces acting upon the annular portion of the lid outside line A tending to unseat the sealing ring 49. It is preferable that the rim 47 be of such diameter that the effective moment of the total force due to internal pressure acting upon the central circular portion of the lid is greater than the effective moment of the total force due to internal pressure acting upon the annular peripheral portion of the rim, in which case sealing action is attained irrespective of the thermostatic action of the lid. This, however, is not essential because a sealing action will be attained even if these opposing moments are equal because of the thermostatic action of the lid. Assuming that the diameter of the rim 47 is such that the opposing moments due to internal pressure are equal and cancel out, it will be apparent that, when the lid is heated and has snapped to its closed position of Fig. 3, heat will cause the lid to tend to become more concave with respect to the vessel. This is because the high expansion component 51 of the lid is on the outside and the low expansion components 53 is on the inside. Once the lid has snapped, continued heating causes the marginal portion of the lid to tend to creep further in the direction of the seat 11. This is an inherent characteristic of snap-acting plates of the type used herein. The rim 47 and pipe 55 take the reaction caused by the creeping action of the lid, and a tight seal is attained.

Furthermore, the diameter of the rim 47 may even be such that the effective moment of the total force acting upon the central circular portion of the lid is somewhat less than the effective moment of the total force acting upon the anular peripheral portion of the lid and still attain a sealing action, as long as the thermostatic action of the lid is sufficient to overcome the difference of the moments. Under these circumstances, if the difference of the moments acting upon the annular peripheral portion of the lid outward of the rim should become great enough to overcome the thermostatic action of the lid, the peripheral portion of the lid will bend upward to vent the vessel. This will occur at a predetermined increase in pressure. By properly designing the lid as to its thermostatic action, mechanical strength, and location of the fulcrum rim 47 it is possible to make the lid self-opening for venting purposes in response to increase in pressure in the vessel above a predetermined safe value. That is, the lid may be designed to remain sealed by its inherent thermostatic action up to a predetermined, safe internal pressure, and to open to vent the vessel at that pressure due to the pressure overcoming the thermostatic action of the lid.

In a practical embodiment of this invention wherein the diameter of rim 13 (of thermostat metal having a flexibility of $145 \times 10^{-7}$ by American Society of Testing Materials standards) is approximately 6¾ inches, I have found that the diameter of rim 47 (line A) may be varied from approximately 4½ inches to 4⅞ inches with a tight sealing action throughout this range, using metal .040 inch thick.

Operation is as follows:

Assuming this invention to be embodied in a pressure cooker, the food to be cooked is placed in the vessel 1 and a sufficient quantity of water to generate steam is added, if required. The closure 3 is applied by engaging hook 21 in the annular groove 17 with hook 23 loose, then locking the closure to the vessel by engaging hook 23 in the groove and latching it by means of latch rod 29. The lid 13 is now cold and occupies the upwardly-bowed, open position of Fig. 2, wherein the sealing ring 49 is substantially spaced from the seat 11 so that the vessel is freely vented to the atmosphere.

Upon heating the vessel, steam is generated and forces air from the vessel. The lid 13 is heated by the steam, by radiation, conduction and condensation, to its hot snapping temperature, whereupon it snaps to its downwardly bowed position of Fig. 3, wherein the sealing ring 49 seals against the seat 11. The weight 77 maintains valve member 73 seated to close the vent pipe so that pressure builds up in the vessel. If the pressure should become excessive, however, the valve member 73 is unseated against the bias of the weight 77 to vent the vessel through the vent pipe until the pressure is reduced to a safe value.

As the allowable pressure builds up in the vessel, it forces the lid 13 against the rim 47 of the plate 41. The pressure causes the central portion of the lid within the rim to bulge upward. Also, thermostat action is effective due to increase in the lid temperature. As a result, the annular portion of the lid outside the rim is forced downward about the rim as a fulcrum, thus forcing the sealing ring 49 into increasingly tighter sealing engagement with the seat 11 as the pressure and temperature increase. This results from the unbalanced forces acting upon the lid in the manner above described.

When cooking is completed, the vessel is cooled until the lid 13 snaps from its Fig. 3 to its Fig. 2 position. This vents the vessel, relieving any residual vacuum therein, so that the entire closure 3 may be readily removed.

While the lid 13 has been particularly illustrated as a dished, snap-acting plate of thermostatic bimetal so as automatically to vent the vessel when its temperature is below a predetermined value, it will be apparent that the lid may be a non-thermostatic dished plate, or even an initially flat plate, where automatic venting action is not essential. While such a lid will not provide for automatic venting action, it will provide for increasingly effective sealing of the vessel with increase in internal steam pressure. It will be understood that where the lid is non-thermostatic the diameter of rim 47 must be such that the moment of the force of the steam acting on the central portion of the lid is greater than the moment of the force of the steam acting on the annular peripheral portion of the lid, since such a lid does not have any thermostatic action. This relationship of the moments is most readily attained by making the rim of such diameter as to bound an inner area which is greater than the area outward of the rim so that the total force acting on the central portion of the lid is greater than the total force acting on the annular peripheral portion of the lid.

In view of the above, it will be seen that the several objects of the invention are achieved and other advantageous results attained.

As many changes could be made in the above constructions without departing from the scope of the invention, it is intended that all matter contained in the above description or shown in the

I claim:

1. A pressure receptacle comprising a vessel having an exterior seat surrounding its mouth, a lid for the vessel comprising a dished, snap-acting thermostatic plate carried at its center by the vessel at and concentric with the mouth of the vessel and with its periphery freely movable with respect to the vessel so that the plate may snap between a first position wherein it is bowed away from the vessel and out of sealing engagement with said seat and a second position wherein it is bowed toward the vessel with its periphery in sealing engagement with said seat, and a generally annular fulcrum mounted upon the vessel in engagement with the exterior of the plate and substantially concentric therewith, the center of the plate being fixed relative to the fulcrum, the fulcrum being spaced from the fixed center of the plate so that the portion of the plate circumscribed by the fulcrum may bulge outward under internal pressure.

2. A pressure receptacle comprising a vessel having an exterior seat surrounding its mouth, a lid for the vessel comprising a dished, snap-acting thermostatic plate mounted on said vessel to snap between a first position wherein it is bowed away from the vessel with its periphery spaced from said seat and a second position wherein it is bowed toward the vessel with its periphery in sealing engagement with said seat, and a generally annular fulcrum mounted upon the vessel in engagement with the exterior of the plate at points so spaced from its center that the combined deformative action of the effective moment of the total force due to internal pressure acting upon the portion of the plate circumscribed by the fulcrum and the inherent thermostatic action of the plate is greater than the deformative action of the effective moment of the total force due to internal pressure acting upon the portion of the plate outward of the fulcrum, the center of the plate being fixed relative to the fulcrum.

3. A pressure receptacle comprising a vessel having an exterior seat surrounding its mouth, a lid for the vessel comprising a dished, snap-acting thermostatic plate mounted on said vessel to snap between a first position wherein it is bowed away from the vessel with its periphery spaced from said seat and a second position wherein it is bowed toward the vessel with its periphery in sealing engagement with said seat, and a generally annular fulcrum mounted upon said vessel in engagement with the exterior of said plate at points so spaced from its center that the effective moment of the total force due to internal pressure acting upon the portion of the plate circumscribed by the fulcrum is greater than the effective moment of the total force due to internal pressure acting upon the portion of the plate outward of the fulcrum, the center of the plate being fixed relative to the fulcrum.

4. A pressure receptacle comprising a vessel having an exterior seat surrounding its mouth, a lid for the vessel comprising a dished, snap-acting thermostatic plate mounted on said vessel to snap between a first position wherein it is bowed away from the vessel with its periphery spaced from said seat and a second position wherein it is bowed toward the vessel with its periphery in sealing engagement with said seat, and a generally annular fulcrum mounted upon the vessel in engagement with the exterior of the plate at points so spaced from its center that the effective moment of the total force due to internal pressure acting upon the portion of the plate circumscribed by the fulcrum is substantially equal to the effective moment of the total force due to internal pressure acting upon the portion of the plate outward of the fulcrum, the center of the plate being fixed relative to the fulcrum.

5. A pressure cooker or the like comprising a vessel having an exterior seat surrounding its mouth, a lid for the vessel comprising a dished, snap-acting thermostatic plate mounted on said vessel to snap from a normal cold position wherein it is bowed away from the vessel with its periphery spaced from said seat to vent the vessel to an oppositely bowed position with its periphery in sealing engagement with said seat, and a generally annular fulcrum mounted upon the vessel in engagement with the exterior of the plate at points so spaced from its center that at a predetermined pressure within the vessel the effective moment of the total force due to internal pressure acting upon the portion of the plate outward of the fulcrum overcomes the thermostatic action of the plate and the effective moment of the total force due to internal pressure acting upon the portion of the plate circumscribed by the fulcrum to vent the vessel, the center of the plate being fixed relative to the fulcrum.

6. A pressure receptacle comprising a vessel having an exterior seat surrounding its mouth, a lid-carrying member detachably connected to the vessel, a lid for the vessel comprising a dished, snap-acting thermostatic plate carried by said member in such relation to the vessel that it is adapted to snap between a first position wherein it is bowed away from the vessel with its periphery spaced from said seat and a second position wherein it is bowed toward the vessel with its periphery in sealing engagement with said seat, a generally annular fulcrum carried by said member bearing against the exterior of the plate at points so spaced from its center that the combined deformative action of the effective moment of the total force due to internal pressure acting upon the portion of the plate circumscribed by the fulcrum and the inherent thermostatic action of the plate is greater than the deformative action of the effective moment of the total force due to internal pressure acting upon the portion of the plate outward of the fulcrum, and a member fixedly connecting the lid-carrying member and the center of the plate to prevent movement of the center of the plate.

7. A pressure receptacle comprising a vessel having an exterior seat surrounding its mouth, a bridge member detachably mounted on the vessel in position spanning its mouth, a lid comprising a dished, snap-acting thermostatic plate carried at its center by said bridge member concentric with the mouth of the vessel and with its periphery free of said bridge member and the vessel so that it can snap between a first position wherein it is bowed away from the vessel out of sealing engagement with said seat and a second position wherein it is bowed toward the vessel with its periphery in sealing engagement with said seat, the center of the plate being fixed relatively to the bridge member, and a generally annular fulcrum on the bridge member bearing against the exterior of the plate on a line bounding an inner plate area so related to the plate area outside the line that the effective moment of the total force due to internal pressure acting upon the area bounded by the line is greater than the effective moment of the total force due to internal pressure acting upon the area outside the line.

8. A pressure cooker or the like comprising a vessel having an exterior seat surrounding its mouth, a lid for the vessel comprising a dished, snap-acting thermostatic plate mounted on said vessel to snap from a normal cold position wherein it is bowed away from the vessel with its periphery spaced from said seat to vent the vessel to an oppositely bowed position with its periphery in sealing engagement with said seat, and a generally annular fulcrum mounted upon the vessel in engagement with the exterior of the plate at points so spaced from its center that the combined deformative action of the effective moment of the total force due to internal pressure acting upon the portion of the plate circumscribed by the fulcrum and the inherent thermostatic action of the plate is greater than the deformative action of the effective moment of the total force due to internal pressure acting upon the portion of the plate outward of the fulcrum, the center of the plate being fixed relative to the fulcrum.

9. A closure for pressure receptacles comprising a bridge member adapted to span the mouth of a receptacle, means on the bridge member for detachably locking it to a receptacle in position spanning its mouth, a lid for the receptacle comprising a dished, snap-acting thermostatic plate supported from the bridge member by means fixing the central portion of the plate relative to the bridge member, and a generally annular fulcrum on the bridge member bearing against the outer face of the plate at points so spaced from the center of the plate that the combined deformative action of the effective moment of the total force due to pressure acting upon the inner face of the portion of the plate circumscribed by the fulcrum and the inherent thermostatic action of the plate is greater than the effective moment of total force due to pressure acting upon the inner face of the portion of the plate outward of the fulcrum.

10. A closure for pressure cookers and like vessels comprising a bridge member adapted to span the mouth of a vessel, means on the bridge member for detachably locking it to a vessel in position spanning its mouth, a lid for the vessel comprising a dished, snap-acting thermostatic plate centrally supported from the bridge member by a member preventing movement of the central portion of the plate relative to the bridge member, and a generally annular fulcrum on the bridge member bearing against the outer face of the plate on a line bounding an inner plate area so related to the plate area outward of the line that the effective moment of the total force due to internal pressure acting upon the area bounded by the line is greater than the effective moment of the total force due to internal pressure acting upon the area outside the line.

11. A closure as set forth in claim 10 wherein said plate-supporting member is adjustable relative to the bridge member to vary the snapping temperature of the plate.

12. A closure as set forth in claim 10 wherein said plate-supporting member comprises a vent pipe extending through the plate, and a pressure relief valve carried by the bridge member for controlling flow through said vent pipe.

13. A closure for pressure cookers and like vessels comprising a bridge member adapted to span the mouth of a vessel, means on the bridge member for detachably locking it to a vessel in position spanning its mouth, a plate having a depending annular rim fixed to and under the bridge member, a vent pipe threaded in the plate concentrically with its rim, a dished, snap-acting thermostatic plate centrally mounted on the lower end of the vent pipe with the annular rim in engagement with the upper surface of the thermostatic plate, and a valve member carried by the bridge member for controlling flow through the vent pipe.

14. A pressure receptacle comprising a vessel having an exterior seat at its mouth, a lid for the vessel comprising a resilient plate peripherally engaging said seat to close the mouth of the vessel and seal it, and a generally annular fulcrum mounted upon the vessel in engagement with the exterior of the plate at points so spaced from its center that the effective moment of the total force due to internal pressure acting upon the portion of the plate circumscribed by the fulcrum is greater than the effective moment of the total force due to internal pressure acting upon the portion of the plate outside of the fulcrum, whereby pressure within the vessel causes said central portion of the plate to bulge outward and thus force the periphery of the plate into sealing engagement with said seat, the center of the plate being fixed relative to the fulcrum.

15. A pressure receptacle comprising a vessel having an exterior seat surrounding its mouth, a lid-carrying member detachably connected to the vessel, a lid comprising a resilient plate carried by said member with its periphery in sealing engagement with the seat, a generally annular fulcrum carried by said member in engagement with the exterior of the plate at points so spaced from its center that the effective moment of the total force due to internal pressure acting upon the portion of the plate circumscribed by the fulcrum is greater than the effective moment of the total force due to internal pressure acting upon the portion of the plate outward of the fulcrum, and a member fixedly connecting the lid-carrying member and the center of the plate to prevent movement of the center of the plate.

16. A pressure receptacle comprising a vessel having an exterior seat surrounding its mouth, a bridge member detachably mounted on the vessel in position spanning its mouth, a lid comprising a resilient plate carried by said bridge member with its periphery in sealing engagement with the seat and with its center fixed relatively to the bridge member, and a generally annular fulcrum carried by the bridge member in engagement with the exterior of the plate on a line bounding an inner plate area which is greater than the plate area outward of the line.

UNTO U. SAVOLAINEN.

REFERENCES CITED

The following references are of record in the file of this patent:

UNITED STATES PATENTS

| Number | Name | Date |
|---|---|---|
| 187,768 | Munzinger | Feb. 27, 1877 |
| 475,135 | Molt | May 17, 1892 |
| 1,106,837 | Pfachler et al. | Mar. 11, 1914 |
| 1,109,828 | Goff | Sept. 8, 1914 |
| 1,834,837 | Hashimoto | Dec. 1, 1931 |
| 2,309,617 | Benson | Jan. 28, 1943 |
| 2,324,356 | Brown | July 13, 1943 |
| 2,387,360 | Smith | Oct. 23, 1945 |
| 2,516,202 | Graham | July 25, 1950 |